Oct. 1, 1957  L. W. HARNESS  2,807,870
METHOD OF MAKING A PROPELLER BLADE
Filed Feb. 5, 1952  2 Sheets-Sheet 1

INVENTOR.
LAWRENCE W. HARNESS
BY
HIS ATTORNEYS

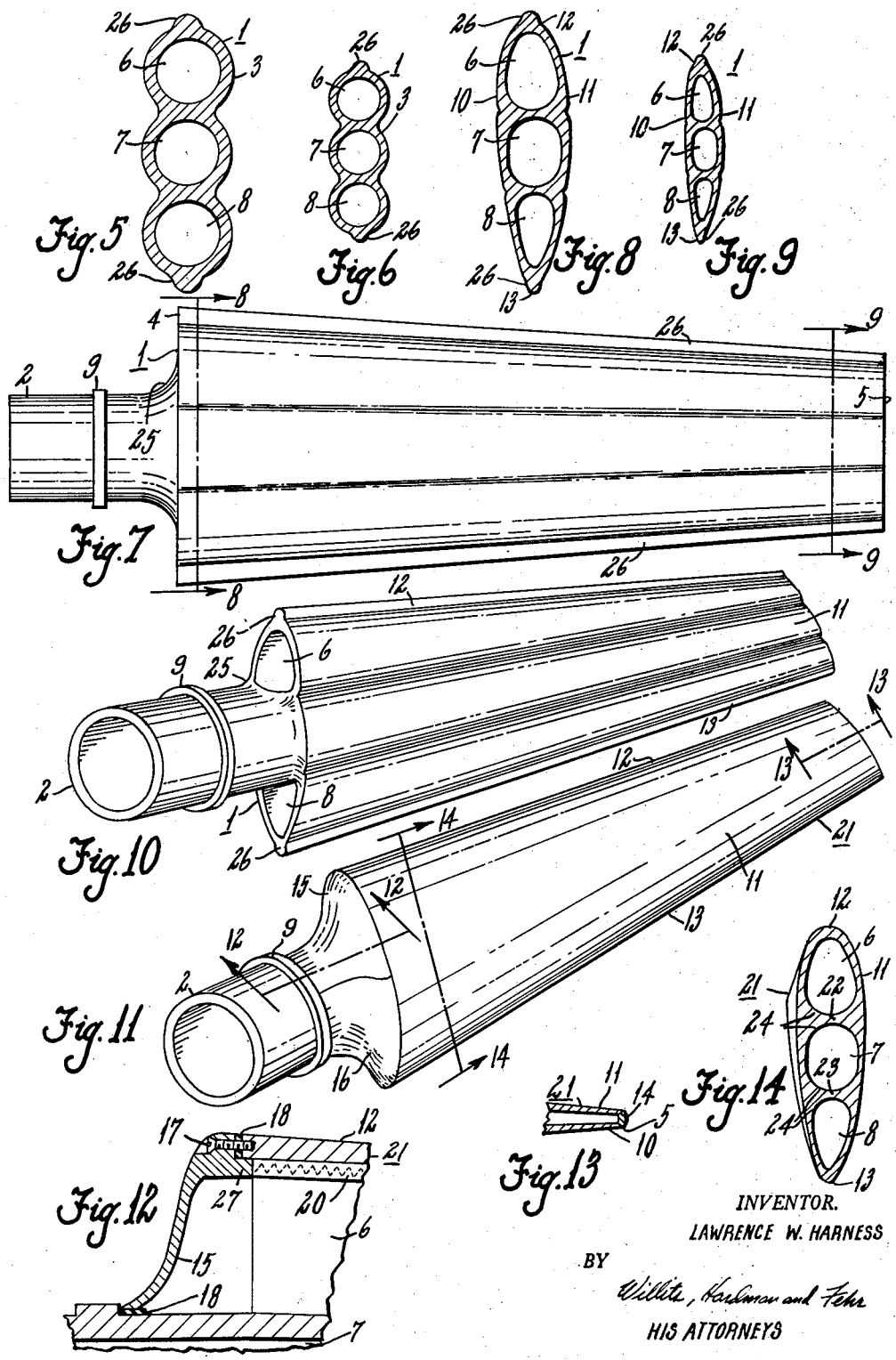

United States Patent Office 2,807,870
Patented Oct. 1, 1957

2,807,870

METHOD OF MAKING A PROPELLER BLADE

Lawrence W. Harness, Dayton, Ohio, assignor to General Motors Corporation, Detroit, Mich., a corporation of Delaware Application February 5, 1952, Serial No. 270,078

3 Claims. (Cl. 29—156.8)

The present invention relates to propeller blades and more particularly to the construction and method of making hollow blades for aircraft propellers.

One of my objects is to provide a hollow propeller blade embodying a unitary forged metal member having internal strengthening ribs. The aforegoing and other objects are accomplished by initially forming a plurality of longitudinal holes in a forged, cast or extruded metal propeller blank of steel or aluminum alloy. The exterior surfaces of the airfoil portion of the blank are then formed so that they are substantially concentric with respect to the inner surfaces of the blank. Following this operation, the exterior surfaces of the airfoil portion of the blank are formed to have a substantially smooth contour after which the airfoil portion is twisted to the desired helix angle. Finally the exterior surfaces of the airfoil portion are ground to perfect their airfoil cross section, the tip end of the blank is welded to seal the ends of the tapered holes and root end seals are installed to close the ends of the holes on both sides of the blade shank.

The finished blade is of a one-piece construction except for the root end seals which may be removable to install or replace heating elements in the leading edge cavity of the blade to provide internal deicing. By reason of the unitary metal forging making up substantially the entire blade, the strength of the airfoil portion of the blade is extremely high in fatigue endurance. The integral internal rib structure of the airfoil portion serves to strengthen the blade, and the integral fillets adjacent the engaging surfaces of the ribs and the thrust and camber faces of the blade serve to reduce the concentration of stress at these engaging surfaces, and thus materially reduce the possibility of blade failure along these surfaces.

Further objects and advantages of the present invention will be apparent from the following description, reference being had to the accompanying drawings wherein a preferred embodiment of the present invention is clearly shown.

Figure 4:
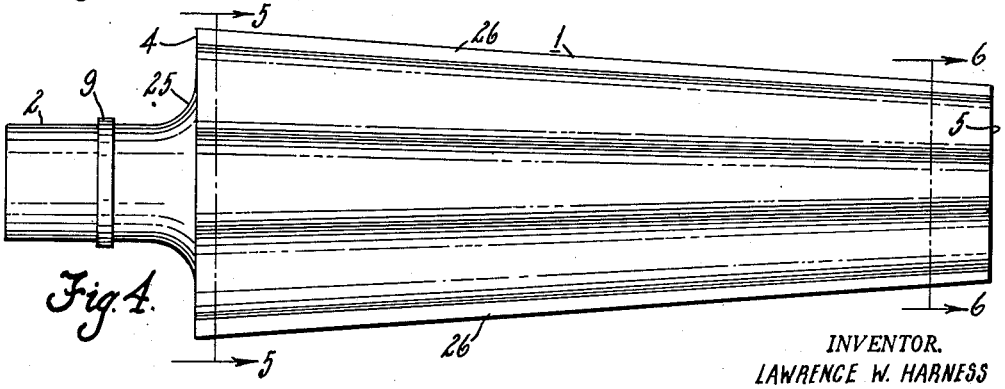
Fig. 4 is a plan view of the blank after the operation of forming the outer surfaces substantially concentric to the inner surfaces.

Figs. 5 and 6 are sectional views taken on lines 5—5 and 6—6 of Fig. 4.

Fig. 7 is a plan view of the blank after the operation of forming a substantially smooth surface contour on the airfoil portion.

Figs. 8 and 9 are sectional views taken on lines 8—8 and 9—9 of Fig. 7.

Fig. 10 is a perspective view of the blank after the operation of twisting the airfoil portion to the proper angle.

Fig. 11 is a perspective view of the finished blade after the outer surfaces of the airfoil portion have been ground, the tip end has been welded and the root end seals have been installed.

Fig. 12 is an enlarged fragmentary sectional view along line 12—12 of Fig. 11 showing a root end seal and a heating unit inside the leading edge cavity.

Fig. 13 is a sectional view along line 13—13 of Fig. 11 showing the weld at the tip end of the blade.

Fig. 14 is a sectional view along line 14—14 of Fig. 11 showing the internal rib structure of the finished blade.

Figure 1:
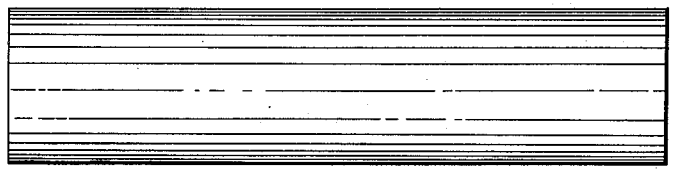
Fig. 1 is a plan view of a billet upon which forming operations are carried out.
Figure 2:
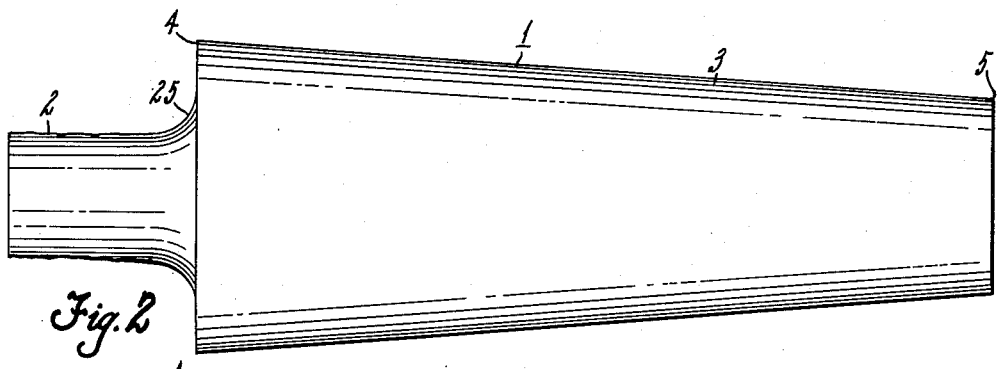
Fig. 2 is a plan view of a metal blank formed from the billet of Fig. 1.
Figure 3:
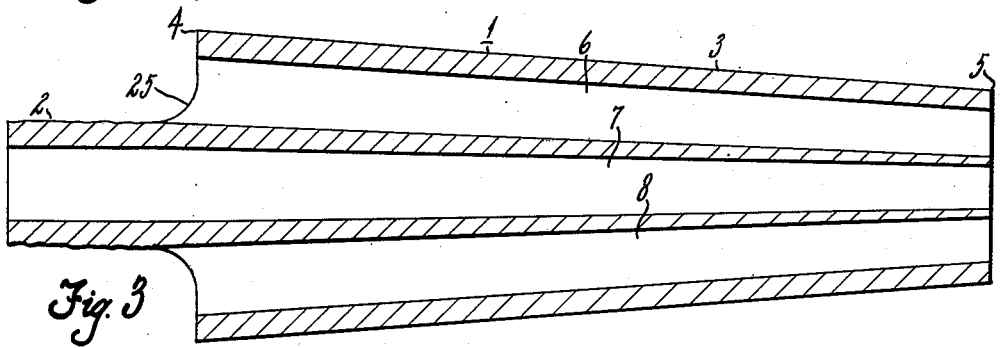
Fig. 3 is a sectional view of the blank after the operation of forming a plurality of longitudinally extending tapered holes has been completed.

Referring more particularly to the drawings, the specific embodiment of my invention preferably starts with a cast, forged or extruded billet of aluminum alloy or steel, such as illustrated in Fig. 1. The billet is initially formed by extrusion into a blank having the general configuration of a propeller blade. The blank 1 is provided with a cylindrical shank portion 2 at one end having integral fillets 25 merging with a member 3 of substantially trapezoidal configuration 1 having edges which converge from the root end 4 to the tip end 5. The first operation performed on the blank 1 is to form a plurality of longitudinally extending holes that taper from the root end to the tip end. These holes may either be formed by extruding straight holes and subsequently taper boring or by taper boring alone, after which the blank 1 has a cross section, as shown in Fig. 3. In the preferred embodiment three holes, 6, 7 and 8, are formed in the metal blank, but any number of holes could be formed to obtain the desired rib strengthening. Alternatively the holes in the blank 1 could be of constant diameter or contoured depending on the type of blade shape desired.

The next operation is to form the exterior surfaces of the airfoil portion or trapezoidal shaped portion 3 of the blank so that they are substantially concentric with respect to the tapered holes, except for the integral bosses 26 at the outer edges thereof. This operation can be accomplished by planing the surfaces. In addition to the forming of the exterior surfaces of the airfoil portion 3 of the blank, a cuff ring 9 is formed on the shank of the blank. The cuff ring 9 is merely used as a support for a cuff that may be installed on the blade when it is mounted on an aircraft. After completion of this operation, blank 1 is of a configuration shown in Fig. 4, while Fig. 5 and Fig. 6 show the substantially concentric relation of the inner and outer surfaces of the airfoil portion 3 near the root and tip ends of the blank, respectively.

The previous two operations of forming the holes and forming the outer surfaces of the airfoil section into substantial concentricity of the inner surfaces, could be combined into a single operation by extruding the billet shown in Fig. 1 to obtain the form of the blank shown in Figs. 4, 5 and 6 of the drawings, with constant diameter holes.

The blank 1 is then heated to a temperature at which it is easily workable after which the airfoil portion 3 of the blank is formed to have a substantially smooth surface contour with the resultant formation of the holes into substantially an elliptical configuration. Simultaneous with the smoothing operation of the airfoil portion, the airfoil portion is upset to provide a thrust face 10, a camber face 11, a leading edge 12, and a trailing edge 13, as is shown in Figs. 8 and 9 of the drawings. This operation is preferably performed by pressing the airfoil portion of the blank between dies having suitably shaped cavities. After completion of this operation, the blank 1 has a general configuration, shown in Figs. 7, 8 and 9, which represent plan and cross sectional views at the root and tip ends of the blank, respectively. The airfoil portion of the blank, shown in Fig. 7, is then twisted by suitably shaped dies to have the desired helix angle. After this operation, the blank has a form as shown in Fig. 10.

Alternatively, the aforegoing operations of smoothing the exterior contour of the airfoal portion and twisting the airfoil portion, may be accomplished by a single operation if the dies between which the airfoil portion is pressed have suitably shaped cavities.

During the next operation, the thrust and camber faces of the airfoil portion are ground to perfect the airfoil cross section which is shown in perspective in Fig. 11, and shown in cross section in Fig. 14. The tip end 5 of the airfoil section is then V-notched and welded or brazed to seal the ends of the holes. The weld 14 is shown in the cross sectional view of the tip end of the finished blade in Fig. 13 of the drawings and extends from the leading edge 12 to the trailing edge 13 and from the camber face 11 to the thrust face 10. Finally, root end seal members 15 and 16 are installed to close the holes or cavities 6 and 8 at the root end of the airfoil portion of the blade. The root end seal members 15 and 16 comprise thin walled members that perfect the blade contour from the airfoil portion to the shank of the blade. The portion of the root end seal member engaging the airfoil portion of the blade is provided with a shoulder 27 which maintains alignment between the root end seal member and the blade. The root end seal members 15 and 16 may be permanently attached to the root end of the blade by welding. Preferably, the root end seal members 15 and 16 may be installed by screw devices 17 (Fig. 12), so that they may be easily removed when it is desired. Flexible seals 18 are placed between the engaging surfaces of the root end seal member and the blade. These seals 18 may take the form of a rubber bond between the engaging surfaces of the blade and root end seal members. Any suitable heating unit 20 such as a deicing boot may be installed in the leading edge cavity 6 to provide internal deicing for the propeller blade.

The finished blade, shown in perspective in Fig. 11 of the drawings, is of substantially a one-piece construction and comprises a hollow body member 21 having three substantially elliptical cavities, 6, 7 and 8, separated by integral ribs 22 and 23, as shown in Fig. 14 of the drawings. The cavities extend substantially from the root end of the airfoil portion blade to the tip end of the blade and the ribs likewise extend substantially the length of the airfoil portion of the blade. In addition, the ribs 22 and 23 have integral fillets 24 adjacent all merging surfaces of the ribs and the interior surfaces of the camber and thrust faces. By the provision of these integral fillets adjacent merging surfaces of the ribs and the thrust and camber blade faces, the concentration of stress along these surfaces is greatly reduced. Likewise, by following the method of the present invention, a blade can be produced having any desired amount of rib strengthening by forming an increased number of tapered longitudinal openings in the propeller blank. Moreover, by using an integral steel or aluminum alloy forging for substantially the entire propeller blade, a uniform grain structure of the metal throughout substantially the entire blade is assured.

While the embodiment of the present invention as herein disclosed, constitutes a preferred form, it is to be understood that other forms might be adopted.

What is claimed is as follows:

1. In the manufacture of a hollow propeller blade, the steps which include taper boring a plurality of longitudinal holes of decreasing diameter from the root to the tip in a metal propeller blade blank, forming the outer surfaces of the blank into substantial concentricity with the inner surfaces, forming the outer surfaces of the blank into a substantially smooth contour airfoil portion, twisting the airfoil portion of the blank to the proper angle, and welding the tip end of the blade blank to seal the ends of the holes thereat.

2. In the manufacture of a hollow propeller blade blank from a solid metal forging, the steps which include taper boring a plurality of longitudinal holes in the forging of decreasing diameter from the root to the tip of the forging, forming the outer surfaces of the forging into substantial concentricity with the inner surfaces, forming part of the outer surfaces of the forging into an airfoil portion, and twisting the airfoil portion of the forging to the proper angle.

3. In the formation of a hollow propeller blade blank from a solid metal forging, the steps which include taper boring a plurality of longitudinal holes in the forging of decreasing diameter from the root to the tip of said forging, planing the outer surfaces of the forging into substantial concentricity with the inner surfaces, simultaneously forming part of the forging into an airfoil portion and twisting the airfoil portion to the proper angle, and grinding the thrust and camber faces of the airfoil portion to perfect its contour.

References Cited in the file of this patent

UNITED STATES PATENTS

| | | |
|---|---|---|
| 1,982,874 | Jamison | Dec. 4, 1934 |
| 2,015,332 | Baumann | Sept. 24, 1935 |
| 2,183,158 | Bennett | Dec. 12, 1939 |
| 2,190,494 | Templin | Feb. 13, 1940 |
| 2,293,801 | Caldwell | Aug. 25, 1942 |
| 2,394,445 | Handler | Feb. 5, 1946 |
| 2,394,446 | Handler | Feb. 5, 1946 |
| 2,457,889 | Gruetjen | Jan. 4, 1949 |
| 2,463,101 | Gruetjen | Mar. 1, 1949 |
| 2,487,860 | Enos | Nov. 15, 1949 |
| 2,511,858 | Lampton | June 20, 1950 |
| 2,535,917 | Gruetjen | Dec. 26, 1950 |
| 2,591,757 | Young | Apr. 8, 1952 |
| 2,643,725 | Heath | June 30, 1953 |
| 2,647,586 | Gruetjen | Aug. 4, 1953 |

FOREIGN PATENTS

| | | |
|---|---|---|
| 401,476 | Germany | Sept. 8, 1924 |
| 710,289 | Germany | Sept. 9, 1941 |
| 958,272 | France | Sept. 12, 1949 |